United States Patent [19]

Miller, III

[11] Patent Number: 4,495,496
[45] Date of Patent: Jan. 22, 1985

[54] PERSONNEL MONITORING AND LOCATING SYSTEM

[75] Inventor: Scott A. Miller, III, Boulder, Colo.

[73] Assignee: Johnson Engineering Corp., Boulder, Colo.

[21] Appl. No.: 330,976

[22] Filed: Dec. 15, 1981

[51] Int. Cl.³ .......................... H04Q 9/00; G08G 1/01
[52] U.S. Cl. ........................... 340/825.54; 340/825.49; 340/941
[58] Field of Search ...................... 340/825.54, 825.49, 340/311.1, 991, 941, 525, 870.13

[56] References Cited

U.S. PATENT DOCUMENTS

| | | | |
|---|---|---|---|
| 3,898,619 | 8/1975 | Carsten et al. | 340/825.54 |
| 3,922,636 | 11/1975 | Jaureguy et al. | 340/24 |
| 4,053,714 | 10/1977 | Long | 340/870.13 |
| 4,083,003 | 4/1978 | Haemming | 340/525 |
| 4,107,689 | 8/1978 | Jellinek | 340/24 |
| 4,224,596 | 9/1980 | Knickel | 340/24 |
| 4,274,083 | 6/1981 | Tomoeda | 340/38 L |

Primary Examiner—Donald J. Yusko
Attorney, Agent, or Firm—O'Rourke & Harris

[57] ABSTRACT

A personnel monitoring and locating system is disclosed that is particularly well suited for monitoring and/or locating underground miners. A plurality of remote terminals having transceivers associated therewith are positioned in a mine and periodically are caused to transmit interrogation signals. Each miner to be monitored is equipped with a transponder that replies to the interrogation signal with the reply signal being timewise delayed by a predetermined amount of time that is different for each of the transponders in use so that the reply from each transponder is timewise spaced from every other interrogated transponder. A host computer at the surface is linked to each remote terminal for transmission of information with information from the remote terminal being indicative of the location of each transponder equipped miner. The transponder carried by each miner is powered by the battery normally carried by the miner for powering a lamp, and the cord extending between the battery and the lamp is utilized by the transponder as a transmitting and receiving antenna.

25 Claims, 14 Drawing Figures

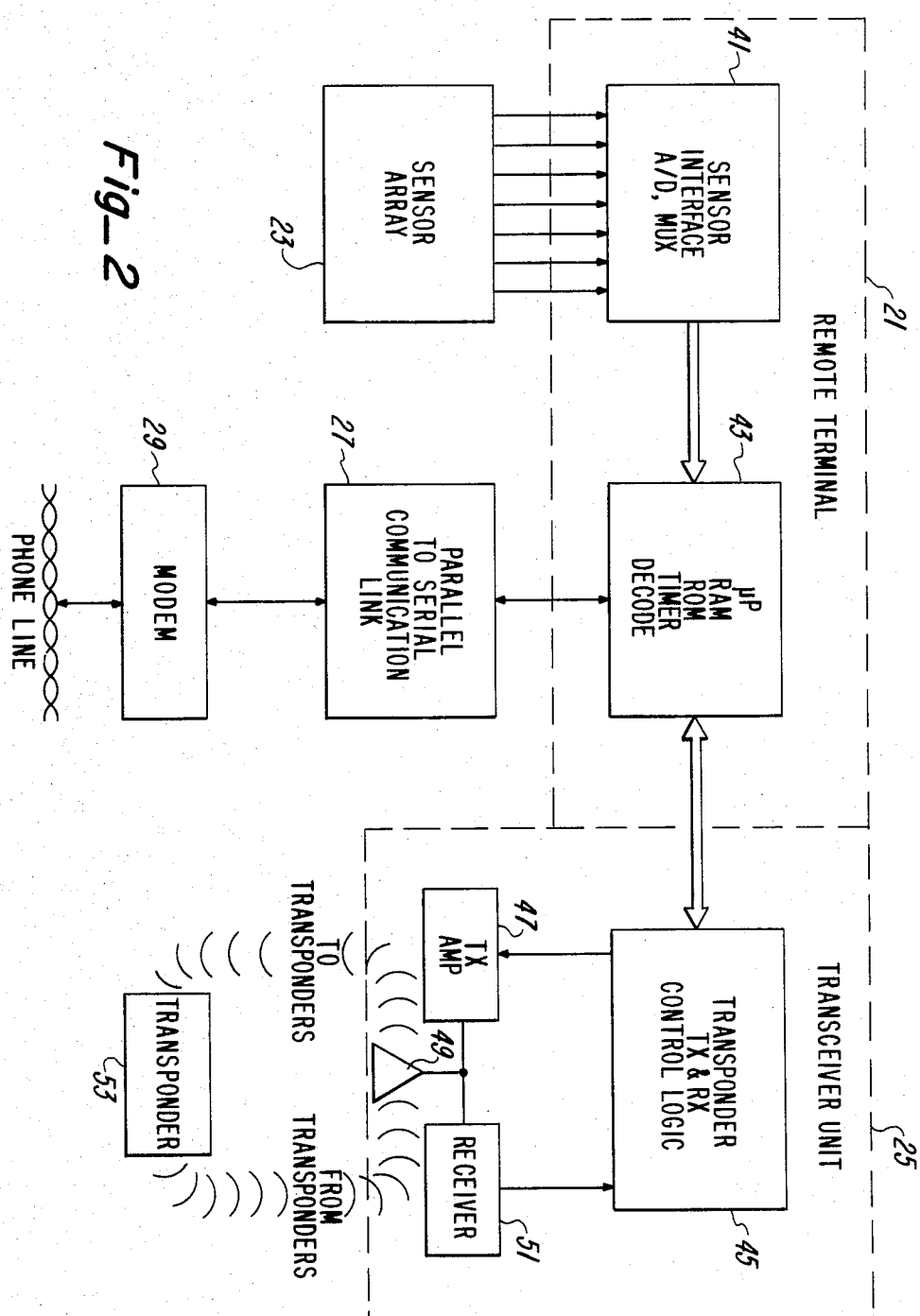

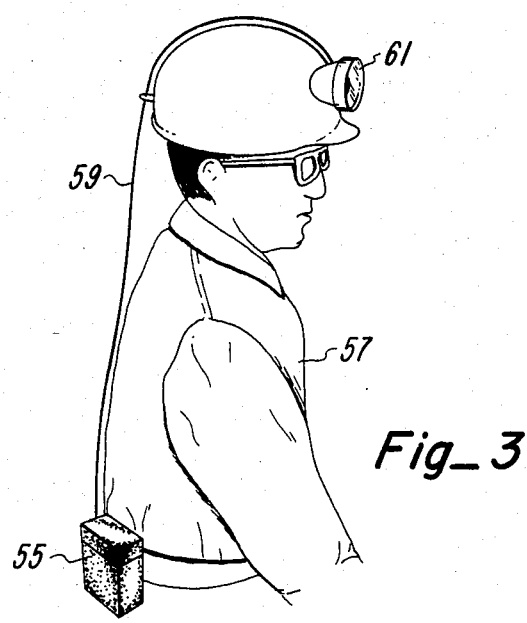
Fig_3
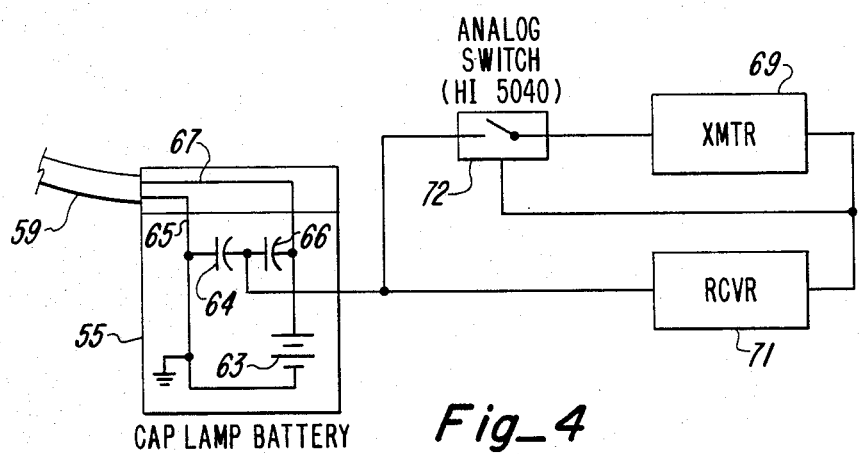
Fig_4

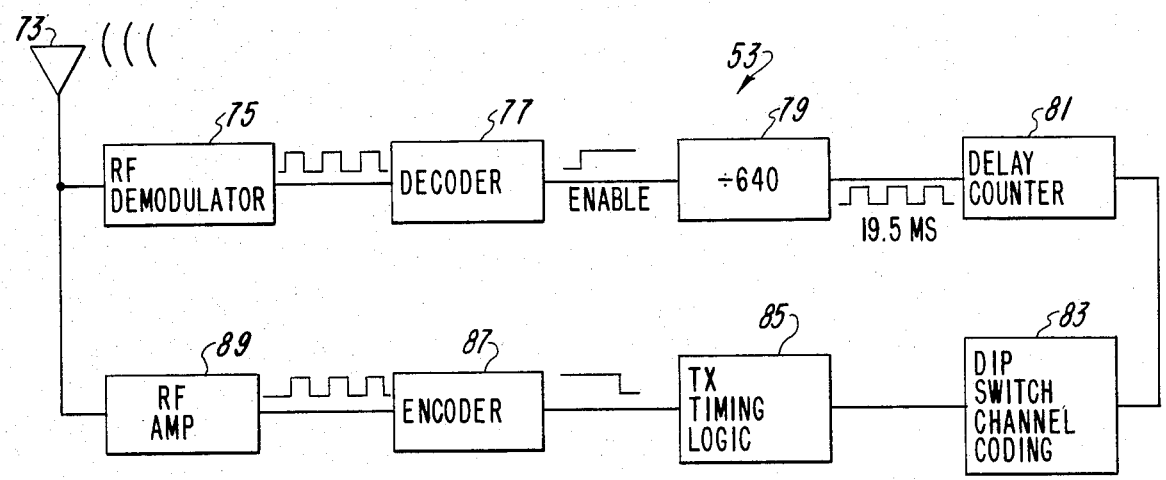
Fig_5
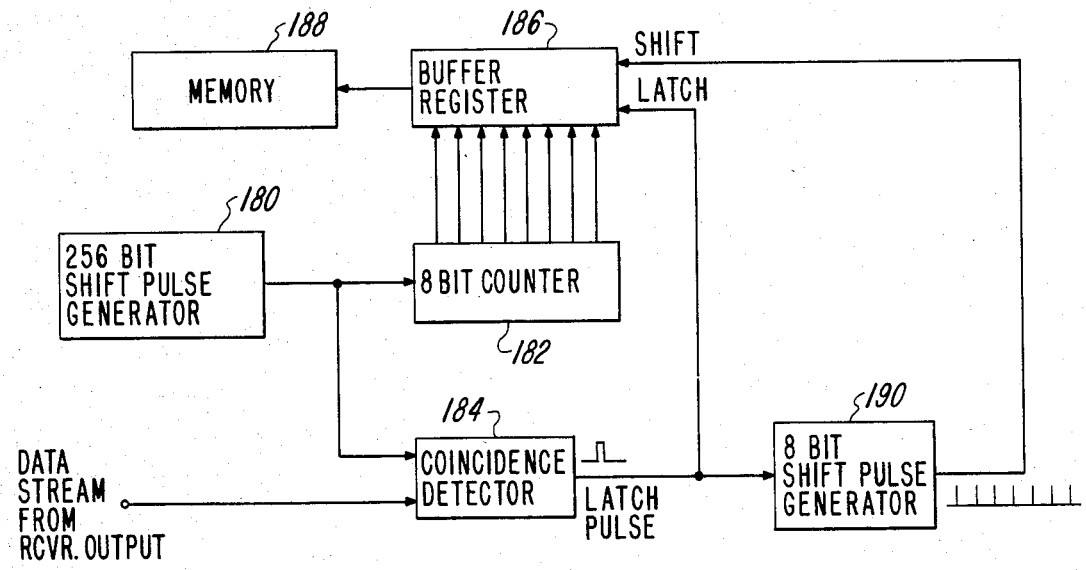
Fig_7

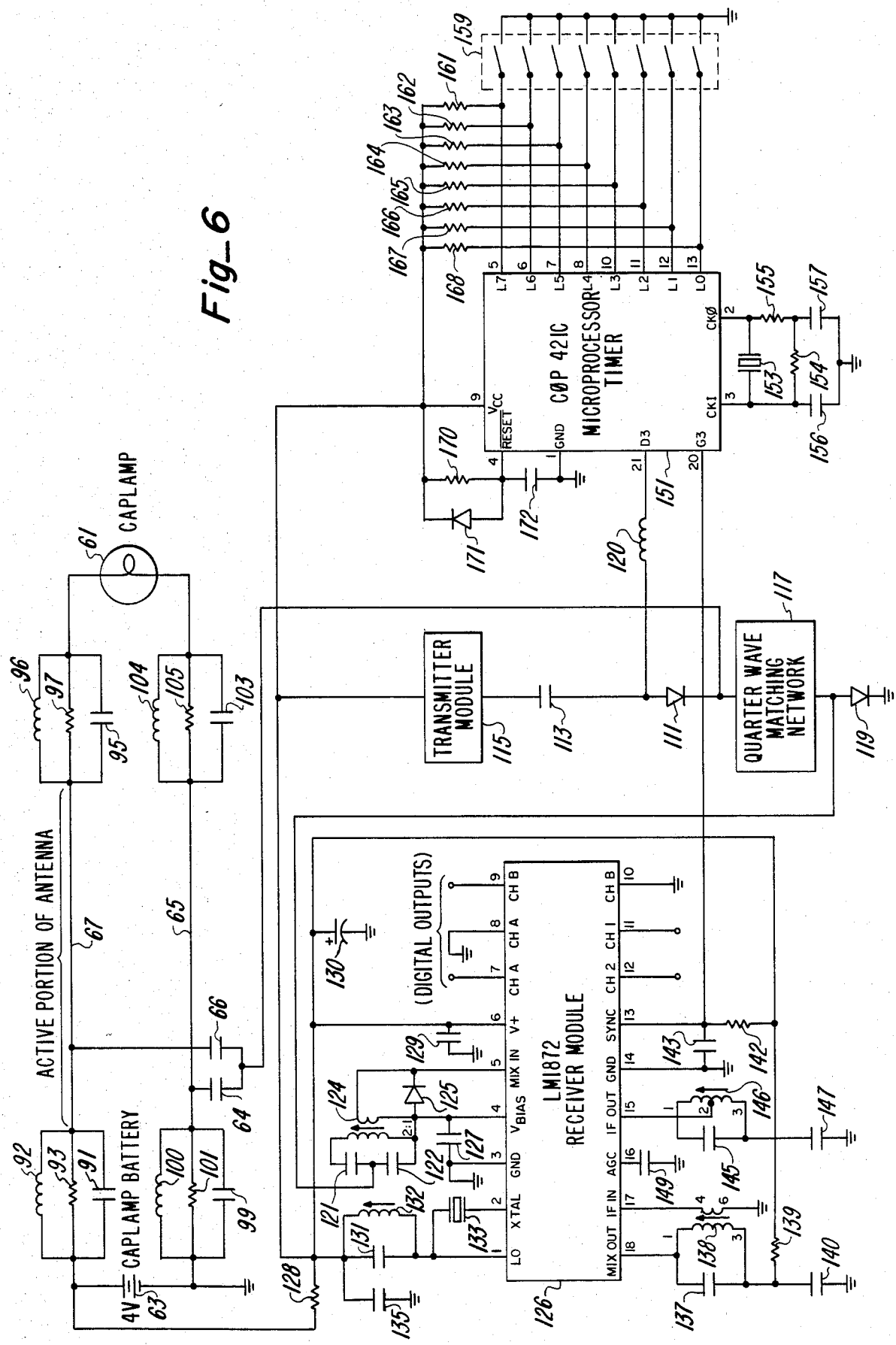
Fig_6

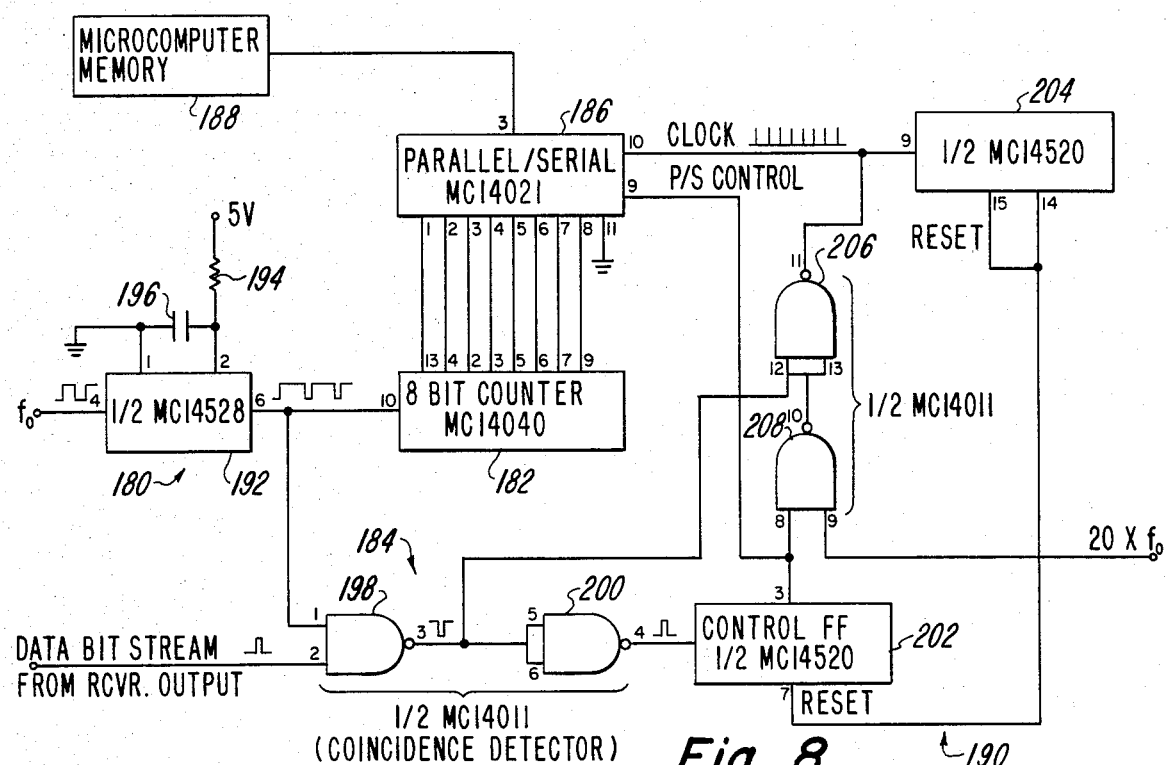
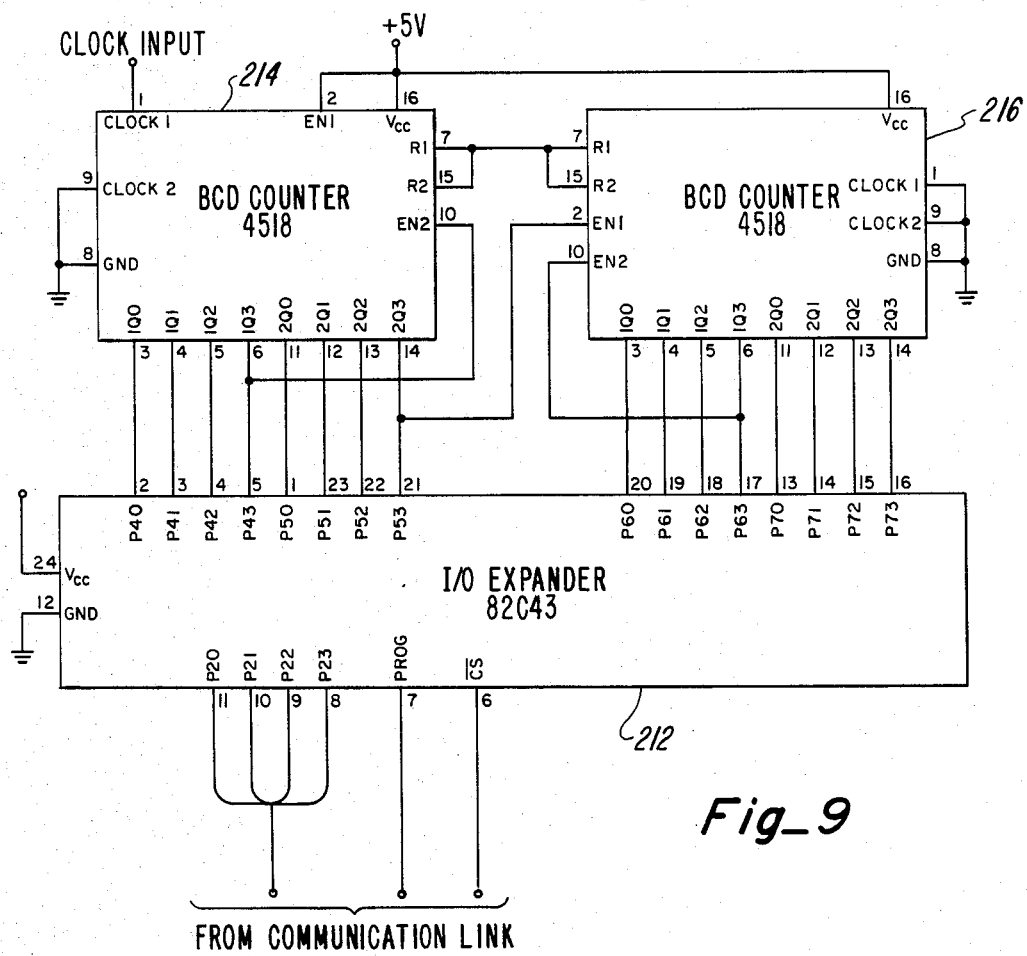
Fig_8
Fig_9

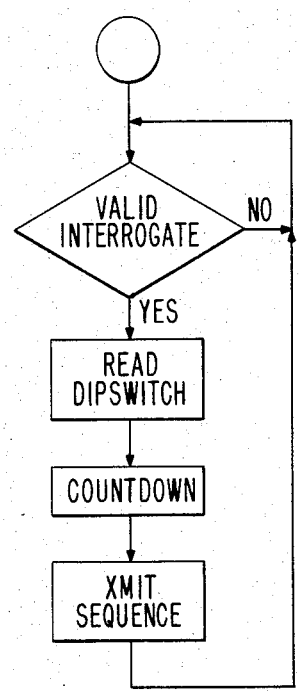
Fig_10
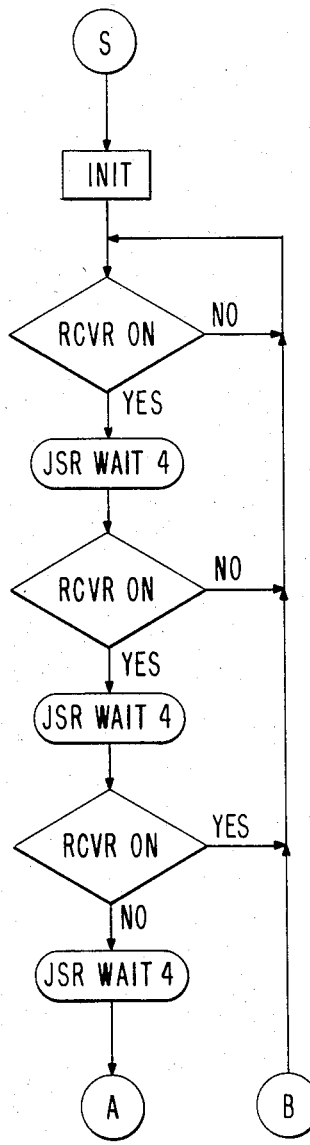
Fig_11
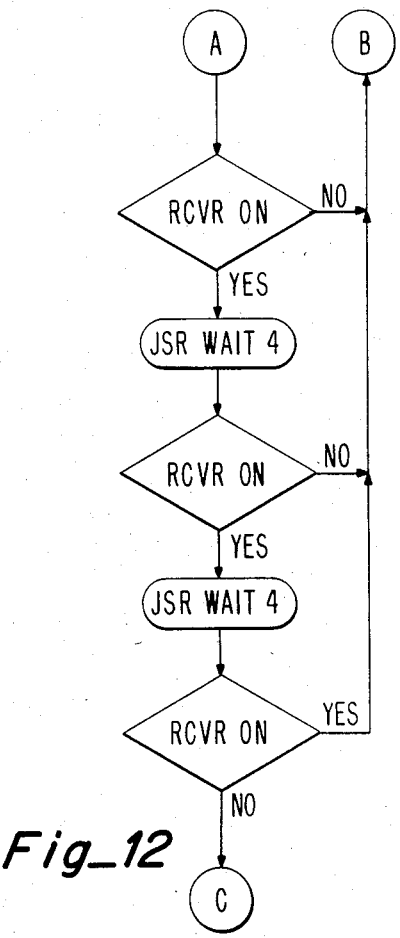
Fig_12

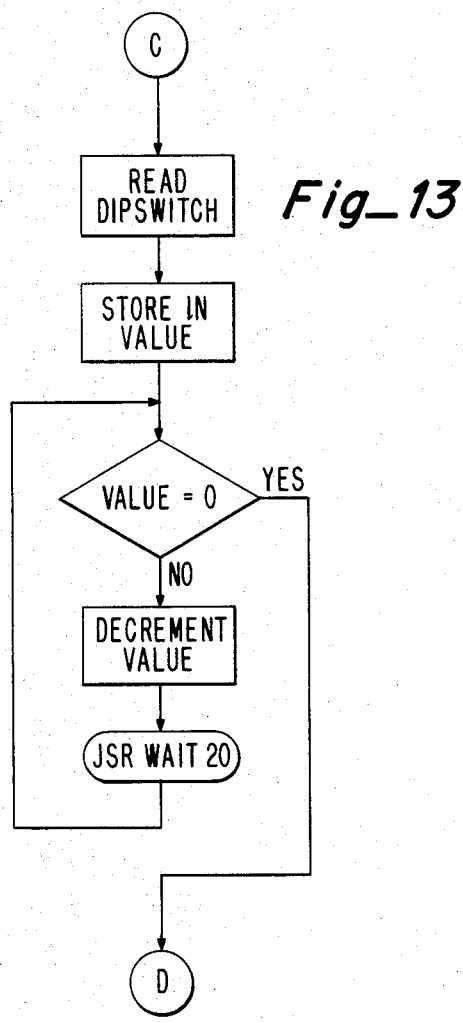
Fig_13
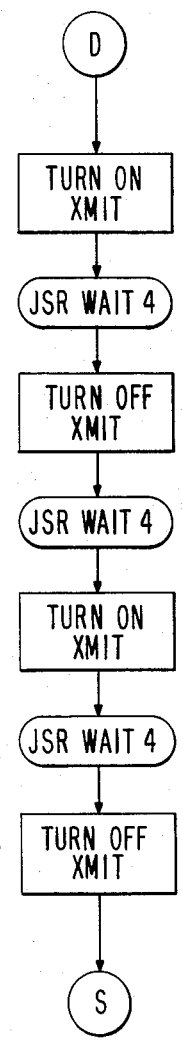
Fig_14

PERSONNEL MONITORING AND LOCATING SYSTEM

FIELD OF THE INVENTION

This invention relates to an object monitoring and locating system, and, more particularly, relates to a system for locating and monitoring underground miners.

BACKGROUND OF THE INVENTION

It is often times necessary, or at least desirable, that the location of objects, including personnel, be known or at least be determinable. This is particularly true, for example, in the case of underground miners.

While various attempts have been made to monitor the position of objects, including personnel, and/or to provide an indication of location, such attempts have not been heretofore completely satisfactory due at least in part to the problems associated with underground mines, the necessity of not unduly burdening the miner and/or providing a relatively simple yet dependable system.

With respect to the prior art patents, various systems have been heretofore suggested for identification of personnel or other objects (see, for example, U.S. Pat. Nos. 4,209,783; 4,223,830; and 4,242,663) and for surveilance of particular areas (see, for example, U.S. Pat. Nos. 3,257,653; 4,095,211; and 4,229,737). In addition, it has heretofore been suggested that a coded signal could be transmitted to a plurality of remote transceivers for activating transponders when a unique code was received by the transponder (see U.S. Pat. No. 3,805,265). Also, it has heretofore been suggested that a pair of pulses can be transmitted to activate a transponder depending upon a preselected spacing between pulses (see U.S. Pat. No. 3,226,680).

SUMMARY OF THE INVENTION

This invention provides a relatively simple yet dependable system for monitoring and/or locating objects, including personnel, that is particularly useful in a mine environment and which does not require burdening of the miner with undue extra equipment.

It is therefore an object of this invention to provide an improved object monitoring system.

It is another object of this invention to provide an improved personnel locating system that is particularly useful in monitoring underground miners.

It is still another object of this invention to provide an improved object monitoring system that is relatively simple yet dependable.

It is still another object of this invention to provide an improved object monitoring system that utilizes transponders associated with the monitored object.

It is yet another object of this invention to provide an improved personnel locating system that does not unduly burden the using personnel.

It is still another object of this invention to provide an improved mine personnel locating system that utilizes the power supply and power cord associated with the lamp of a miner in conjunction with a transponder.

It is yet another object of this invention to provide an improved personnel locating system that utilizes transponders and a time division multiplexing arrangement.

With these and other objects in view, which will become apparent to one skilled in the art as the description proceeds, this invention resides in the novel construction, combination, and arrangement of parts substantially as hereinafter described and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 2 is an expanded block diagram of a remote terminal and transceiver unit, together with associated circuitry, as shown in FIG. 1;

FIG. 3 is a pictorial side view illustrating a miner equipped with a lighting arrangement having portions preferrably utilized in conjunction with this invention;

FIG. 4 is a simplified schematic and block diagram illustrating the connection of a miner equipped transponder with the lighting arrangement power cord for use of the cord by the transponder as a transmitting and receiving antenna;

FIG. 5 is a simplified block diagram of the transponder utilized in this invention;

FIG. 6 is an expanded block and schematic diagram of the transponder shown in FIG. 5 utilized in conjunction with a battery pack and power cord in accordance with this invention;

FIG. 7 is a simplified block diagram illustrating microprocessor hardware for decoding of a 256 bit location data word;

FIG. 8 is an expanded block and schematic diagram illustrating microprocessor hardware for decoding of a 256 bit location data word;

FIG. 9 is a block diagram of a modem useful in this invention as shown in FIGS. 1 and 2; and FIGS. 10 thru 14 are flow charts illustrating operation of the transponder utilized in this invention.

DESCRIPTION OF THE INVENTION

Figure 1:
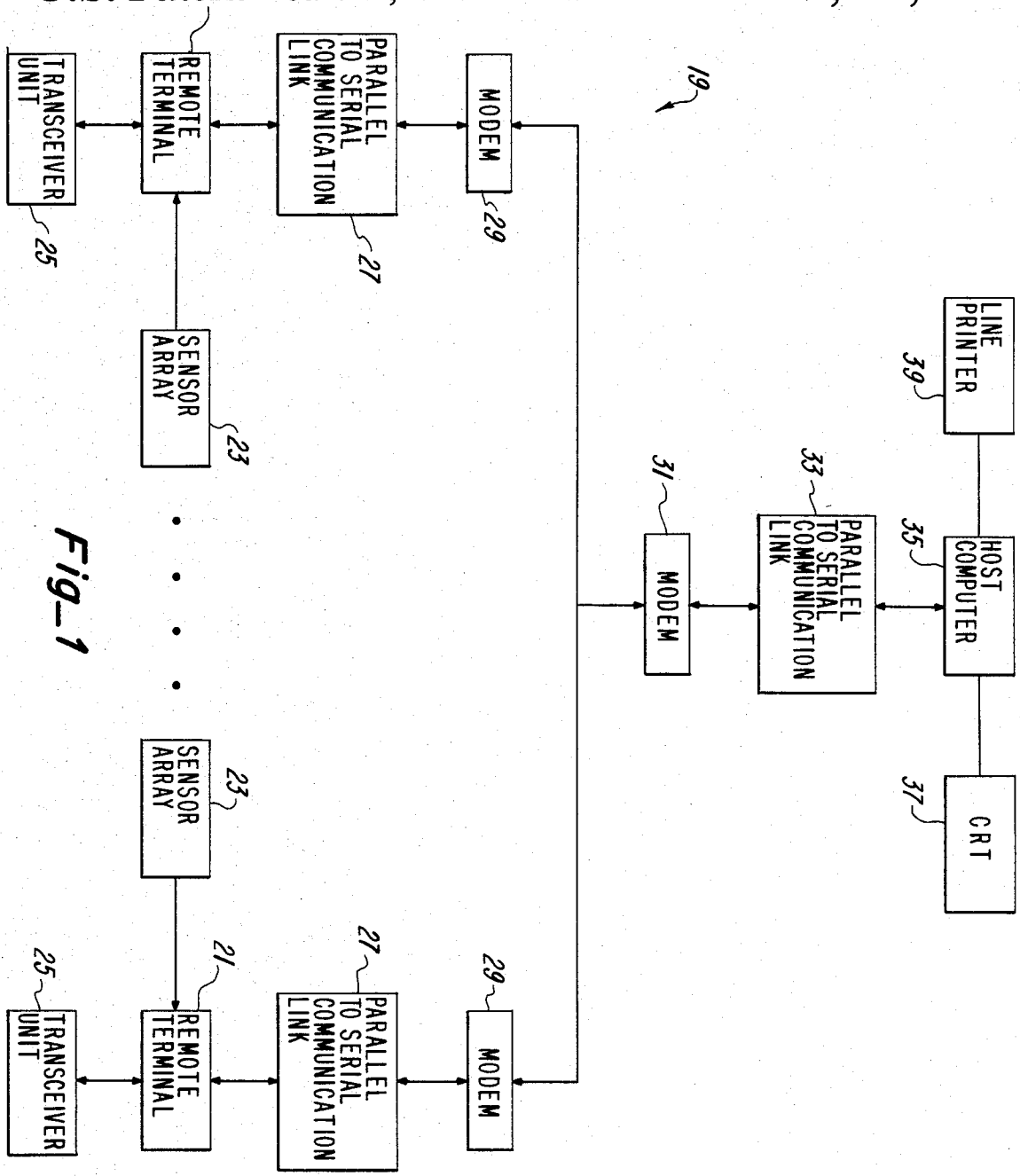
FIG. 1 is a block diagram of the overall system of this invention.

The overall system 19 for locating and/or determining the position of transponder equipped personnel (or other objects) is shown in FIG. 1. As shown, a plurality of remote terminals 21 are utilized, each of which terminals are positioned as deemed necessary or desirable to facilitate locating the transponder equipped personnel. For use in mines, for example, remote terminals 21 may be positioned at predetermined entrances to different portions of the mine or at predetermined points in the mine shaft. By so locating the remote terminals 21, it is possible to sense the presence of a transponder equipped miner and send information indicative thereof to the surface where a record is established of miner presence and/or location within the mine.

As shown in FIG. 1, each remote terminal 21 has a sensor array 23 and a transceiver unit 25 connected therewith. Each remote terminal, in conjunction with sensor array 23 and transceiver unit 25, provides an identifying code with each data word sent from the remote terminal, synchronizes the transponder communicating with the remote terminals through the transceiver units, and causes the remote terminals to send out pulses for interrogation purposes through transceiver units 25.

Each remote terminal 21 is connected through parallel-to-serial communication link 27 to modem 29, with modems 29 being commonly connected to modem 31 which is connected through parallel-to-serial communication link 33 to host computer 35. As indicated in FIG. 1, host computer 35 is preferrably connected with a CRT display 37 and a line printer 39.

Remote terminal 21 and transceiver unit 25 are shown in greater detail in FIG. 2. As shown, remote terminal 21 includes a sensor interface unit 41 (which preferably includes, as indicated, analog-to-digital and memory circuitry), connected with sensor array 23 and processing unit 43 (which preferably includes a microprocessor memory, random access memory, read only memory, timer and decoder circuitry). Processor unit 43 is connected through parallel-to-serial communication link 27 to modem 29 which may be typically connected, for example, to a conventional telephone line.

Transceiver unit 25 includes a transmitter and receiver control logic unit 45, the output from which is coupled through transmitter amplifier 47 to antenna 49 from which the transmitted signal is radiated to transponders 53. The reply signals from transponders 53 are received at antenna 49 and coupled to receiver 51 which is connected with transponder transmitter and receiver control logic unit 45.

The method by which the system acquires personnel location information is digital, although not necessarily compatible with any standard coding technique. That is, after each interrogation of a particular terminal location, the terminal hardware forms a 256 bit word containing the information on specific miners in that area at that time. In other words, the location word will be an array of ones and zeros (256 bits) where the ones represent the specific transponder which gave a response upon interrogation.

This 256 bit word can be decoded locally at each terminal before transmitting to the surface or can be transmitted to the surface as a 256 bit location word and decoded at the surface by the host computer. By decoding at the surface, the mechanism for decoding need only be implemented once (at the host computer). However, where the nonstandard format of the 256 bit word upsets the data protocol to the extent that it would require more effort in the terminal hardware and software to design around it, then decoding of the information at each remote terminal into eight bit word identifying each response prior to transmitting this information to the surface is advisable. This can be done in microcomputer circuitry at each location and is considered preferrable.

Each remote terminal 21 is able to communicate with host computer 35, and host computer 35 is able to communicate with each remote terminal 21. In order to differentiate between remote terminals, each remote terminal 21 includes an identifying code with each data word sent to the host. All transactions from each remote terminal contains only updated data that has changed from the previous transmission. If the digital inputs are unchanged, this is preferably signalled by a particular code (such as, for example, a code 5 and all zeros signifying a "no change" condition). If no new transponder replies are received, this is also preferably signalled by a particular code (such as, for example, a code 9 where all zeros are returned). Keyboard data is buffered by each remote terminal and only complete messages are sent to the host computer 35. Upon completion of a message from remote terminal 21, another code (such as, for example, a code 15) is transmitted by the remote terminal to indicate completion. Upon receipt by host computer 35 the computer responds either by echoing the code to signify that all transactions were completed successfully, sending another code (such as, for example, a code 10), to request a retransmission of some or all remote data, or downloading display information to the remote.

To utilizing miners, system operation appears to allow direct communication between remote terminals. Remote terminals originating the messages sends all keyboard data to the host computer, and the host computer, in turn retransmits this data as display information to the receiving remote station with a maximum delay of 3.2 seconds.

A larger mine having, for example, 15 working sections with 15 men per section, will have a total underground work force of 225 men. The system of this invention is designed to accomodate an underground work force of up to 256 miners using an 8 bit binary I.D. code. Descrimination between simultaneous transmissions from several different transponders in the same vicinity is achieved utilizing time-division multiplexing. A single interrogate pulse train from a remote terminal synchronizes all transponders. In turn, all transponders transmit an identical reply code, except the response are timewise spaced, or staggered. This time-division multiplexing arrangement allows simple DIP switch channel selection at the transponders.

Remote interrogation of a transponder is started by the remote terminal sending out a train of five pulses, each one microsecond wide and two microseconds apart. The transponder decoder, upon receiving this valid pulse train, begins a delay countdown. Each transponder has a unique delay as its channel I.D. Upon completion of the delay, power is applied to the transmitter section and a response code is transmitted twice. This response code will again be a train of five pulses, each 0.5 microseconds wide. The timing just described allows the complete cycle to occur in approximately 15 microseconds, and allowing necessary time for component tolerances, all 256 transponder channels are interrogated in 5 seconds.

This transponder design includes easy implementation, identical devices, transmitter power reduced to low power consumption, and fast response, with all support circuitry being CMOS logic.

As indicated in FIG. 3, a battery pack 55 is normally worn by each miner 57 with the battery pack being normally connected by power cord 59 to lamp 61 mounted in the cap of the miner to thus provide a lighting arrangement. For use in this invention, cord 59 provides a transmit and receive antenna with power from battery pack 55 being also utilized to power transponder 53 (which may be built into either the battery or lamp).

This antenna approach for the transponder is feasible by making the best use of the power cord (which is normally three feet long and connects the cap-lamp to the battery). However, the wave length of R.F. transmission is $\lambda = c/f$ where $\lambda$ is wavelength is meters, c is the speed of light ($3 \times 10^8$ m/sec), and f is the frequency in Hz, at f=MHz, $\lambda$=approximately 6.1 meters. A quarter wave monopole antenna would thus be approximately 1.5 meters which is approximately 4.92 feet. Thus, an optimum match to the communications circuits for receiving and transmitting is not achieved by use of a 3 foot power cord, but such a cord may nevertheless be successfully utilized in this case (though not optimally utilized).

Connection of transponder 53 to the power cord is shown in FIG. 4. As shown, the negative terminal of battery 63 is connected to one side of capacitor 64 and to negative lead 65 of cord 59, while the positive terminal of battery 63 is connected to one side of capacitor 66 and to positive lead 67 of cord 59. For antenna purposes, the other side of capacitors 64 and 66 are connected with the junction therebetween being connected to transmitter 69 and receiver 71, with the connection to transmitter 69 being through analog switch 72 (preferably a Harris H15040). Switch 72 momentarily switches transmitter 69 into the circuit when a reply response is called for by receiver 71.

The transponder is also powered from cap-lamp battery pack 55. This is preferably accomplished by connecting the transponder to the power lead so that the transponder is "on" whenever the cap-lamp is "on".

The transponder current drain is only a small fraction of the lamp current drain, so that even when the transponder is not in use, the current drain impact of leaving it energized is negligible. There are several significant advantages in powering the transponder by means of the cap-lamp battery pack, including ensuring that the batteries will be up whenever the miner goes underground (since it is a well established routine for miners to charge their cap-lamp batteries daily) and minimizing the possibility of the transponder being left on inadvertantly over a long period of time. The main disadvantage of such an arrangement is that the transponder is not self-contained and must be interfaced with an existing peice of commercial equipment to function properly.

FIG. 5 is a block diagram of transponder 53 showing the functional logic thereof. As shown, the incoming signal is received at antenna 73 and coupled to R.F. demodulator 75, the output from whch is coupled to decoder 77 where an enable signal output is provided that is coupled to a divide-by-640 unit 79 which provides a 19.5 microsecond output signal. This output is coupled through delay counter 81 and DIP switch channel coding unit 83 to transmitter timing logic unit 85. The output from transmitter timing logic unit 85 is coupled to encoder 87 which produces an output signal that is coupled through R.F. amplifier 89 to antenna 73 to be transmitted as a reply signal from the transponder. As brought out hereinabove, this reply signal is timewise delayed by a predetermined time delay so that the reply signal is transmitted within a predetermined time window and thus is distinguished from replies from other transponders that might be replying to the interrogation signal from the remote terminal.

FIG. 6 is an expanded block and schematic diagram of transponder 53, shown in conjunction with miner equipped power and lamp circuitry. As brought out hereinabove, the positive terminal of battery 63 (of battery pack 55 normally carried by the miner) is connected to cap-lamp 61 through lead 67. As shown in FIG. 6, lead 67 is provided with filters at opposite end portions to establish an active portion of the antenna. More particularly, the positive terminal of battery 63 is connected to one side of parallel connected capacitor 91 and resistors 92 and 93, while one side of cap-lamp 61 is connected to one side of parallel connected capacitor 95 and resistors 96 and 97 with the active portion of the antenna being provided by that portion of lead 67 existing between the filters. In like manner, the negative (grounded) side of battery 63 is connected to cap-lamp 61 through lead 65 which also includes a pair of filters one of which is formed by parallel connected capacitor 99 and resistors 100 and 101, and the other of which is formed by parallel connected capacitor 103 and resistors 104 and 105.

Use of the power cord as both the transmitting and receiving antenna, while not optimum, utilizes equipment normally carried by the miner. Since this cord must carry the D.C. to the cap-lamp, the RF signal to be transmitted and received is isolated from the remainder of the circuitry by use of the filters at each end of the cord. The filters are parallel resonant traps selected for the frequency band to be utilized for the transmitted and received signals. In this case, use of a 49 MHz center frequency with a Q factor of the traps of about 5 results in a band width of 9.8 MHz centered about the 49 MHz center frequency is preferred.

Both sides of the cord are excited with an RF signal which is preferred to exciting only one side since the cable could have 20 pf of shunt capacitance per foot which would severely load the active wire.

The thus formed antenna is connected to transponder 53, and more particularly, the portions of lead 65 and 67 extending between the filter are connected through capacitor 64 and 66, respectively, to the transmitter and receiver units of the transponder.

For use of the antenna for both transmitting and receiving, an antenna switch is utilized to keep RF out of the receiver while transmitting and to prevent the transmitter output circuit from absorbing signals during reception. This antenna switch is achieved, as shown in FIG. 6, by use of a diode switch arrangement. As shown, the antenna is connected through diode 111 and capacitor 113 to transmitter module 115, and through quarter wave matching network 117 to diode 119 to the receiver module circuitry.

The diode switch operates as follows: during transmit, both diodes 111 and 119 are forwardly biased by current through RF choke 120 so that diode 111 connects transmitter module 115 to the antenna and diode 119 places an RF short across the receiver module input, (which short reflects through quarter wave matching network 117 to provide an "open" at the point where power would otherwise flow from the antenna to the receiver). 30 db or more isolation is preferable in this switch. All diodes are hot-carrier type and all capacitors are large volume chip type. The quarter wave matching network has an impedance that matches the receiver input and antenna circuits.

While a National LM 1871 transmitter could be utilized for transmitter module 115, this would require a 6 volt source (and thus not be directly usable with a normal 4 volt cap-lamp battery 63). Such use would therefore require a DC to DC converter. Hence, it is preferred to use a transmitter module which directly requires only a 4 volt power supply in order to use cap-lamp battery 63.

As shown in FIG. 6, quarter wave matching network 117 is connected to one side of capacitors 121 and 122, the opposite sides of which are connected to the primary winding of transformer 124. The secondary winding of transformer 124 has a diode 125 connected thereacross, is connected to pins 4 and 5 of receiver module 126, and is connected with pin 3 and ground through a capacitor 127.

Power from the transponder is supplied from battery 63 through resistor 128 to transmitter module 115 and to pin 6 of receiver module 126 (with capacitors 129 and 130 to ground being also connected to the positive voltage line. The positive power line is also connected through parallel connected capacitor 131 and inductor 132 to crystal 133, with the junction of resistor 128 and capacitor 131 having a capacitor 135 to ground connected therewith.

Pin 18 of receiver module 126 is connected to one side of parallel connected capacitor 137 and inductor 138, the other side of which is connected through resistor 139 to the positive power line and to ground through resistor 140. The positive power line is also connected through resistor 142 to pin 13 of receiver module 126 and with ground through capacitor 143. Pin 15 of receiver module 126 is connected with the center tap of inductor 146, which inductor has a capacitor 145 connected thereacross and one side connected with ground through capacitor 147. In addition, pin 16 of receiver module 126 is connected with ground through capacitor 149.

Microprocessor timer 151 is connected at pin 21 to inductor 120 (for keying the transmitter module off and on), at pin 20 to pin 13 of receiver module 126 (to receive the input from the receiver module), and at pins 2 and 3 to opposite sides of crystal 153 (32.768 KHz which allows a 244 microsecond instruction cycle time). Resistors 154 and 155 are connected in series with one another and connected in parallel with crystal 153 with the opposite ends of resistor 154 being connected with ground through capacitors 156 and 157.

DIP switch 159 has eight switching elements for use in selecting 1 of 256 addresses. Each switching element is connected with a different pin of microprocessor timer 151 so that the switch can be read by the microprocessor timer, with each connection having one side of a resistor (resistors 161–168) connected therewith with the resistors being connected in common at the other side to the positive power line and to one side of parallel connected resistor 170 and diode 171 (the other side of which is connected with pin 4 of microprocessor timer 151 and with ground through capacitor 172).

FIG. 7 is a simplified block diagram illustrating microprocessor hardware that is used in all of the remote terminals 21. As shown in FIG. 7, the output of 256 bit shift pulse generator 180 is coupled to 8 bit counter 182 and to coincidence detector 184, which detector also receives the data stream from the receiver output. The output from coincidence detector 184 is a latch pulse which is coupled to buffer register 186 (connected with memory 188) and to 8 bit shift pulse generator 190, with generator 190 providing a shift input to buffer register 186.

FIG. 8 is an expanded block diagram illustrating microprocessor hardware that is used in each remote terminal to decode the 256 bit location data word. As shown, a 256 bit shift pulse generator 180 provides a pulse train to 8 bit counter 182 and to coincidence detector 184. The output from 8 bit counter 182 are coupled to buffer register, or parallel/serial unit 186, which register supplies an output to microprocessor memory unit 188 and receives inputs from 8 bit shift pulse generator 190 and coincidence detector 184.

As shown in FIG. 8, 256 bit shift pulse generator 180 includes an integrated circuit 192 connected with a 5 volt power supply through resistor 194 having a capacitor 196 to ground connected therewith. Coincidence detector 184 includes a pair of NAND gates 198 and 200, while 8 bit shift pulse generator 190 includes a control flip-flop 202 the reset output of which is coupled to integrated circuit 204. The output of NAND gate 198 is coupled to NAND gate 206, which receives a second input from NAND gate 208 connected with control flip-flop 202, and supplies an output to parallel/serial unit 186 (latch input). As shown, the output from control flip-flop 202 provides a P/S control input to parallel/serial unit 186.

FIG. 9 illustrates a typical modem that can be utilized in the invention. As shown, the input from the communication link is coupled to I/O expander 212 which is connected with dual BCD counters 214 and 216. By this arragement, the free running pulse frequency input is converted to a calibrated digital output.

FIGS. 10 through 14 are flow charts to illustrate the invention. A simplified flow chart for transponder general operation is shown on FIG. 10. Details of a valid integration of the transponder is shown in FIGS. 11 and 12 with coding therefore being as follows:

| CODING FOR VALID INTERROGATE | | |
|---|---|---|
| ADDRESS | INSTRUCTION | OP. CODE |
| 000 | CLRA | 00 |
| 001 | LBI 0 | 33 |
| 002 | — | 80 |
| 003 | STII 0 | 70 |
| 004 | STII 0 | 70 |
| 005 | LBI 0,1 | 33 |
| 006 | — | 81 |
| 007 | SMB 3 | 4B |
| 008 | ING | 33 |
| 009 | — | 2A |
| 00A | SKE | 21 |
| 00B | JP 7 | C7 |
| 00C | JSR WAIT 4 | 60 |
| 00D | — | B0 |
| 00E | ING | 33 |
| 00F | — | 2A |
| 010 | SKE | 21 |
| 001 | JP 7 | C7 |
| 002 | JSR WAIT 4 | 60 |
| 003 | — | B0 |
| 004 | RMB 3 | 43 |
| 005 | ING | 33 |
| 006 | — | 2A |
| 007 | SKE | 21 |
| 008 | JP | C7 |
| 009 | JSR WAIT 4 | 60 |
| 00A | — | B0 |
| 00B | SMB 3 | 4B |
| 00C | ING | 33 |
| 00D | — | 2A |
| 00E | SKE | 21 |
| 00F | JP 7 | C7 |
| 020 | JSR WAIT 4 | 60 |
| 021 | — | B0 |
| 022 | ING | 33 |
| 023 | — | 2A |
| 024 | SKE | 21 |
| 025 | JP 7 | C7 |
| 026 | JSR WAIT 4 | 6B |
| 027 | — | 00 |
| 028 | RMB 3 | 43 |
| 029 | ING | 33 |
| 02A | — | 2A |
| 02B | SKE | 21 |
| 02C | JP 7 | C7 |
| 02D | JMP 40 | 60 |
| 02E | — | 40 |

Coding for a 4 microsecond weight subroutine is as follows:

| CODING FOR 4 MS WAIT SUBROUTINE | | |
|---|---|---|
| ADDRESS | INSTRUCTION | OP. CODE |
| 0C0 | NOP | 44 |

CODING FOR 4 MS WAIT SUBROUTINE

| ADDRESS | INSTRUCTION | OP. CODE |
|---|---|---|
| 0C1 | NOP | 44 |
| 0C3 | NOP | 44 |
| 0C4 | NOP | 44 |
| 0C5 | NOP | 44 |
| 0C6 | NOP | 44 |
| 0C7 | NOP | 44 |
| 0C8 | NOP | 44 |
| 0C9 | NOP | 44 |
| 0CA | NOP | 44 |
| 0CB | NOP | 44 |
| 0CC | NOP | 44 |
| 0CD | NOP | 44 |
| 0CE | NOP | 44 |
| 0CF | NOP | 44 |
| 0D0 | NOP | 44 |
| 0D1 | RET | 48 |

Details for read and countdown are shown in FIG. 13, with coding therefore being as follows:

CODING FOR READ & COUNTDOWN

| ADDRESS | INSTRUCTION | | OP. CODE |
|---|---|---|---|
| 040 | LBI | 0,2 | 33 |
| 041 | — | | 82 |
| 042 | INL | | 33 |
| 043 | — | | 2E |
| 044 | LBI | 0,0 | 33 |
| 045 | — | | 80 |
| 046 | SKE | | 21 |
| 047 | JP | | C9 |
| 048 | JP | | D0 |
| 049 | COMP | | 40 |
| 04A | AISC | 1 | 51 |
| 04B | NOP | | 44 |
| 04C | COMP | | 40 |
| 04D | JSR | WAIT 20 | 69 |
| 04E | — | | 00 |
| 04F | JP | | C6 |
| 050 | XAD | 0,2 | 23 |
| 051 | — | | 82 |
| 052 | SKE | | 21 |
| 053 | JP | | D5 |
| 054 | JMP | 80 | 60 |
| 055 | — | | 80 |
| 056 | COMP | | 40 |
| 057 | AISC | 1 | 51 |
| 058 | NOP | | 44 |
| 059 | COMP | | 40 |
| 05A | JSR | WAIT 20 | 69 |
| 05B | — | | 00 |
| 05C | XAD | 0,2 | 23 |
| 05D | — | | 82 |
| 05E | COMP | | 40 |
| 05F | JP | | C6 |

Coding for a 4 microsecond weight subroutine is as follows:

CODING FOR 20 MS WAIT SUBROUTINE

| ADDRESS | INSTRUCTION | OP. CODE |
|---|---|---|
| 100 | NOP | 44 |
| | NOP | 44 |
| ↓ | ↓ | ↓ |
| 14F | NOP | 44 |
| 150 | RET | 48 |

Details for a transmit sequence is shown in FIG. 14, with coding therefore being as follows:

CODING FOR XMIT SEQUENCE

| ADDRESS | INSTRUCTION | | OP. CODE |
|---|---|---|---|
| 080 | RC | | 32 |
| 081 | CLRA | | 00 |
| 082 | AISC | 8 | 58 |
| 083 | CAB | | 50 |
| 084 | OBD | | 33 |
| 085 | — | | 3E |
| 086 | JSR | WAIT 4 | 6B |
| 087 | — | | 00 |
| 088 | CLRA | | 00 |
| 089 | CAB | | 50 |
| 08A | OBD | | 33 |
| 08B | — | | 3E |
| 08C | JSR | WAIT 4 | 6B |
| 08D | — | | 00 |
| 08E | AISC | 8 | 58 |
| 08F | CAB | | 50 |
| 090 | OBD | | 33 |
| 091 | — | | 3E |
| 092 | JSR | WAIT 4 | 6B |
| 093 | — | | 00 |
| 094 | CLRA | | 00 |
| 095 | CAB | | 50 |
| 096 | OBD | | 33 |
| 097 | — | | 3E |
| 098 | JMP | 7 | 60 |
| 099 | — | | 07 |

From the foregoing, it should be apparent that this invention provides an improved monitoring and/or locating system that is particularly well suited for use in conjunction with monitoring miners in an underground mine.

What is claimed is:

1. A system for monitoring a plurality of movable objects within a preselected area, said system comprising:
   a plurality of transmitting means at said preselected area;
   control means connected with said plurality of transmitting means to cause each of said plurality of transmitting means to provide an interrogation pulse output at predetermined times;
   a plurality of transponder means each of which is associated with and constrained to movement with a different one of said movable objects, with said plurality of transponder means being capable of simultaneously receiving said interrogation pulse output from said plurality of transmitting means, and with each of said transponder means, responsive to receipt of said interrogation pulse output from said transmitting means, providing a reply output with said reply output from each of said transponder means being delayed by different predetermined time intervals so that all reply outputs from said transponder means occur at different time intervals with respect to one another; and
   signal processing means for providing an output indicative of the particular transponder means from which a reply output was received to thereby enable monitoring of the objects associated with said transponder means.

2. The system of claim 1 wherein said system includes central processing means connected with each of said transmitting means.

3. The system of claim 1 wherein each of said transponder means includes delay means for delaying said reply output for a predetermined period of time upon receipt of said interrogation output from said transmitting means to thereby establish said different predetermined time intervals.

4. The system of claim 1 wherein said signal processing means includes receiving means includes a plurality of receivers at predetermined spaced positions within said preselected area.

5. The system of claim 4 wherein said signal processing means also includes decoding means includes central processing means connected with each of said receivers.

6. The system of claim 1 wherein said signal processing means includes decoding means includes means for sensing the time interval between said interrogation output from said transmitting means and receipt of said reply output from said transponder means and responsive thereto determining the particular transponder means from which said reply output was received.

7. The system of claim 1 wherein said plurality of transmitting means are positioned within a mine, and wherein said monitored objects are underground miners each of which is equipped with a transponder means.

8. A system for monitoring a plurality of underground miners within a mine, said system comprising:
   transmitting means positioned within said mine and providing an interrogation output;
   a plurality of transponder means each of which is associated with and constrained to movement with a different one of said underground miners, with each of said transponder means, responsive to receipt of said interrogation output from said transmitting means, providing a reply output with said reply output from each of said transponder means occurring at different time intervals with respect to one another, said miners being equipped with lighting means including a power cord, and wherein said transponder means are connected with said power cord whereby said power cord provides a transmitting and receiving antenna for said transponder means;
   receiving means at said predetermined area for receiving said reply outputs from said transponder means; and
   decoding means connected with said transmitting means and said receiving means for decoding said reply outputs received from said transponder means and, responsive thereto, providing an indication of said movable objects associated with said replying transponder means.

9. The system of claim 8 wherein said system includes RF filters electrically connected on said power cord to establish the effective length of said antenna.

10. The system of claim 8 wherein said power cord extends between battery means and a lamp, and wherein said transponder means is connected with said battery means for powering said transponder means.

11. A system for monitoring a plurality of movable objects within a preselected area, said system comprising:
   a plurality of remote terminals at said preselected area;
   a plurality of transceiver units each of which is connected with a different one of said remote terminals with each of said transceiver units providing an interrogation output at predetermined times and for receiving reply outputs responsive thereto; computer means;
   communication link means connecting said remote terminals with said computer means;
   a plurality of transponders each of which is associated with a different one of said objects to be monitored, each of said transponders having means for receiving said interrogation output from said transceiver units and responsive thereto providing reply outputs with the reply output from each of said transponders being delayed by different predetermined time intervals so that all reply outputs from said transponders are timewise spaced with respect to one another; and
   signal processing means for providing an output indicative of the particular transponder from which a reply output was received to thereby enable monitoring of the objects associated with said transponders.

12. The system of claim 11 wherein said system includes means for receiving said indications from said signal processing means and responsive thereto establishing and maintaining the location of said monitored objects.

13. The system of claim 12 wherein said communication link means includes a plurality of first parallel-to-serial communication links each of which is connected with a different one of said remote terminals, modem means connected with said first parallel-to-serial communication links, and a second parallel-to-serial communication link connected with said modem means.

14. The system of claim 11 wherein said monitored objects are underground miners.

15. The system of claim 11 wherein said system includes sensor array means connected with each of said remote terminals.

16. The system of claim 14 wherein said monitored miners have a lamp powered by a battery connected with said lamp through a power cord, and wherein each said transponder is connected with said power cord so that said power cord acts as an antenna for each said transponder.

17. The system of claim 16 wherein said power cord has an RF filter at opposite end portions thereof to determine the effective length of said antenna.

18. The system of claim 16 wherein said transponder is connected with said battery for powering said transponder by said battery.

19. The system of claim 11 wherein each of said transponders includes a microprocessor timer for establishing said time delay for said reply output.

20. The system of claim 19 wherein each of said transponders includes switching means connected with said microprocessor timer for establishing said time delay for said reply output.

21. A system for monitoring underground miners, said system comprising:
   a plurality of remote terminals within a mine;
   a plurality of transceiver units each of which is connected with a different one of said remote terminals with each of said transceiver units providing an interrogation output at predetermined times;
   a plurality of first "parallel-to-serial" communication links each of which is connected with a different one of said remote terminals;
   modem means connected with said first parallel-to-serial communication links;
   a second parallel-to-serial communication link connected with said modem means;
   computer means connected with said second parallel-to-serial communication link;

a plurality of transponders each of which is carried by a different miner to be monitored, with each of said transponders including means for receiving said interrogation output from said transceiver units and responsive thereto providing reply outputs with the reply output from each of said transponders being delayed by different predetermined time intervals so that all reply outputs from said transponders are timewise spaced with respect to one another; and signal processing means connected with said transceiver means for providing an output indicative of the particular transponder from which a reply output was received to thereby enable monitoring of transponder equipped miners.

22. The system of claim 21 wherein said signal processing means includes means for providing an 8 bit digital output signal indicative of the particular transponder from which said reply output was received.

23. The system of claim 22 wherein said signal processing means includes means for handling 256 bits.

24. The system of claim 21 wherein each of said miners is equipped with a cap-lamp powered by a battery connected with said lamp through a power cord, and wherein said transponder is connected with said power cord so that said power cord serves as the antenna for said transponder, said power cord having RF filters thereon to establish the effective length of said antenna.

25. The system of claim 24 wherein said battery is connected with said transponder to power the same.

* * * * *